3,059,241
DIPPED PLASTIC GLOVE
William J. O'Brien, Hamden, and Raymond E. Downey, West Haven, Conn., assignors to The Seamless Rubber Company, New Haven, Conn., a corporation of Connecticut
No Drawing. Filed May 4, 1960, Ser. No. 26,674
5 Claims. (Cl. 2—167)

This invention relates to relatively thin gauge plastic surgeons gloves and to a process for making such gloves.

Heretofore surgeons gloves have been made of thin gauge rubber, say about 0.010 inch or more. This thickness imparts the necessary strength to the surgeons glove which is so vital to insure sterility, but it leaves much to be desired in respect to tactile sensitivity, a prerequisite for surgeons gloves.

Thin gauge plastic gloves have heretofore been made for household use. These gloves have been made from heat-sealed, two-ply sheeting. These gloves, however, are loose fitting in that they do not conform snugly against the hands, nor do they possess the necessary strength for use as surgeons gloves. In addition, they are not adapted to sterilization.

It is an object of the present invention to produce surgeons gloves which because of their extreme thinness, high strength and excellent flexibility permit extreme tactile sensitivity.

It is a further object of the invention to produce surgeons gloves which are capable of being repeatedly steam or gas sterilized as desired.

Another object of the present invention is to provide a shorter process for preparing transparent to translucent plastic surgeons gloves in controlled thickness.

Still another object is to provide a process in which metal as opposed to porcelain forms may be used to produce the gloves.

The present invention provides a low cost, thin gauge, snug-fitting, high strength and very resilient surgeons glove which is capable of being repeatedly steam or gas sterilized. These gloves can be transparent or translucent as well as opaque or made in colors, for example operating room "green." In addition, they can be formed on either metal or porcelain forms, whereas the rubber gloves usually must be produced on porcelain forms.

The surgeons gloves produced according to the present invention are much thinner than conventional gloves heretofore made of rubber, affording a substantially greater degree of tactile sensitivity. More specifically, surgeons gloves of equivalent durability to rubber surgeons gloves can be made in a thickness of about 0.003 to 0.008 inch. Despite this thin gauge, the gloves have such a high resiliency that they may be stretched several hundred percent and still return immediately to their original shape. Unlike rubber, these plastic gloves will not oxidize in air, nor will they ozone or sun check. In addition, they will stand more heat and ultraviolet light than rubber before failure. Because of the low cost of the gloves, they can be discarded after use. The gloves are non-toxic, non-allergic and may be printed or otherwise marked for identification purposes. Furthermore, the gloves are more easily released from the forms on which they are made than are conventional rubber gloves. Still another advantage of the gloves of the present invention is that they can be made more quickly than rubber gloves. More specifically, the complete cycle for producing the gloves is about 30 minutes as compared to a complete cycle of from 3½ to 4 hours for rubber gloves.

The gloves of the present invention are produced from a glove-forming cement formulation containing a vinyl chloride-vinyl acetate copolymer plasticized with polymeric plasticizers. Typical formulations in percent by weight are:

Example 1

|  | Typical Formulation | Range |
| --- | --- | --- |
| Borden VC-175 | 15 | about 13-16. |
| Paraplex G-54 | 7.5 | about 5-10. |
| Plastolein No. 9250 | 2.5 | about 2-10. |
| Tetrahydrofuran | 75 | about 73-78. |

Example 2

|  | Typical Formulation | Range |
| --- | --- | --- |
| Borden VC-170 | 8 | about 7-9. |
| Borden VC-175 | 8 | about 5-9. |
| Paraplex G-54 | 8 | about 2-9. |
| Plastolein No. 9250 | 3 | about 2.5-3.5. |
| Tetrahydrofuran | 73 | about 69.5-76.5. |

Example 3

|  | Typical Formulation | Range |
| --- | --- | --- |
| Borden VC-170 | 10.8 | about 10-11. |
| Paraplex G-54 | 5.4 | about 5-10. |
| Plastolein No. 9250 | 1.8 | about 1.8-10. |
| Methylethylketone | 82.0 | about 82.2-83.5. |

Borden VC-175 and Borden VC-170 are copolymers of polyvinyl chloride and vinyl acetate. Paraplex G-54 is a linear polyester of the type described in U.S. Patent No. 1,779,367, assigned to Rohm and Hass Co. Plastolein No. 9205 is a tetrahydrofurfuryloleate plasticizer for vinyl resins produced by Emery Industries.

According to the process of the present invention the glove forms enter the glove-forming cement formulation as described above at a speed of 50 inches per minute, are subjected to a 10 second dwell and are withdrawn at a rate of 10 inches per minute. The form is then rotated for a period of 30-45 seconds at room temperature at which time the above procedure is repeated. In some cases, for example, the formulation of Example 2, only one dip is necessary to produce a glove having a thickness of about .003 to about .004 inch. The gloves are then allowed to stand at room temperature for about 3 minutes and then proceed to a drying area where they remain for 10 minutes at about 150° F. After this low temperature dry, they are brought to a rolling station where a bead is rolled on each glove. The gloves are next subjected to a high temperature heat set of 300° F. or higher for 4 minutes. When the gloves come out of the high temperature oven they are either dipped in a slurry of Ezon, a surgical dusting starch, to be cooled and stripped in the slurry, or the gloves may be dry dusted and stripped. In the latter case they are allowed to cool for approximately 5 minutes and then dusted with Ezon on the outside and stripped in an aerosol or cascade of surgical dusting powder. If the gloves are to be wet stripped in a slurry of dusting powder, provision is made for the wet gloves to be dried in a tumbling dryer.

After stripipng, the glove forms may be cleaned by an air jet. If the gloves are stripped wet, however, the forms may require a clear water rinse and an air dry. The gloves made according to the present invention have a relatively high tensile strength of about 2000 p.s.i.

The forms may be any type suitable for producing gloves according to this process such as metal or porcelain forms. Metal forms, especially aluminum, are desirable since they permit electrical inspection of the gloves for holes prior to stripping.

In addition to methylethylketone, other vinyl solvents may be used, e.g., tetrahydrofuran. In general, the choice of solvent, or blend of solvents, will depend on such properties as evaporation rate, solvent power, toxicity, cost, etc. Such solvents are well known to those skilled in this art.

A suitable container for formulating the glove-forming compound is a stainless steel 50 gallon drum in which the material may be mixed wtih an air stirrer. The dipping tank may consist of a stainless steel tank, 12 inches square and 24 inches deep, fed from the bottom by a reservoir of glove-forming cement formulation contained in a vented stainless steel can. To dip 100 pairs of gloves in equipment of this size requires about 3 galolns of glove-forming cement formulation.

As many and varied modifications of the subject matter of this invention will become apparent to those skilled in the art from the detailed description given herein, it should be understood that this invention is to be limited only in accordance with the appended claims.

We claim:

1. A thin-gauge, resilient, disposable plastic glove formed from a cement formulation comprising, by weight, from 16.5% to 30.5% of a plasticized vinyl resin and from 69.5% to 84.5% of a vinyl solvent, the plasticizer in said plasticized vinyl resin comprising tetrahydrofurfuryloleate and a linear polyester, the tetrahydrofurfuryloleate being present in an amount from about 1.5% to about 10% based on the total composition and the linear polyester being present in an amount from about 2% to about 10% based on the total composition.

2. A thin-gauge, resilient, disposable plastic glove prepared from a plasticized vinyl resin, the plasticizer in said resin comprising a mixture of tetrahydrofurfuryloleate and a linear polyester, the tetrahydrofurfuryloleate being present in an amount from about 5% to about 60.6% and the linear polyester being present in an amount from about 6.6% to about 60.6%, based on the weight of the plasticized vinyl resin.

3. A thin-gauge, resilient, disposable plastic glove formed from a cement formulation comprising from about 13% to about 16% of a copolymer of vinyl chloride and vinyl acetate, from about 5% to about 10% of a linear polyester, from about 2% to about 10% of tetrahydrofurfuryloleate and from about 73% to about 78.5% tetrahydrofuran.

4. A thin-gauge, resilient, disposable plastic glove formed from a cement formulation comprising from about 12% to about 18% of a copolymer of vinyl chloride and vinyl acetate, from about 2% to about 9% of a linear polyester, from about 2.5% to about 3.5% tetrahydrofurfuryloleate and from about 69.5% to about 76.5% tetrahydrofuran.

5. A thin-gauge, resilient, disposable plastic glove formed from a cement formulation comprising from about 10% to about 11% of a copolymer of vinyl chloride and vinyl acetate, from about 5% to about 10% of a linear polyester, from about 1.8% to about 10% tetrahydrofurfuryloleate and from about 82.2% to about 83.5% methylethylketone.

References Cited in the file of this patent

UNITED STATES PATENTS

| | | |
|---|---|---|
| 2,423,143 | Gottschalk | July 1, 1948 |
| 2,670,473 | Stebic | Mar. 2, 1954 |
| 2,779,025 | Perry | Jan. 29, 1957 |
| 2,847,715 | Dosmann | Aug. 19, 1958 |
| 2,873,450 | Brodeur | Feb. 17, 1959 |
| 2,913,729 | Wisenburg | Nov. 24, 1959 |

UNITED STATES PATENT OFFICE
CERTIFICATE OF CORRECTION

Patent No. 3,059,241                          October 23, 1962

William J. O'Brien et al.

It is hereby certified that error appears in the above numbered patent requiring correction and that the said Letters Patent should read as corrected below.

Column 3, line 27, for "84.5%" read -- 83.5% --.

Signed and sealed this 26th day of March 1963.

(SEAL)
Attest:

ESTON G. JOHNSON

Attesting Officer

DAVID L. LADD

Commissioner of Patents